United States Patent [19]

Baheri

[11] Patent Number: 5,146,377
[45] Date of Patent: Sep. 8, 1992

[54] ADJUSTABLE MAGNETIC HEAD MOUNTING SYSTEM

[75] Inventor: Hamid Baheri, Sherman Oaks, Calif.

[73] Assignee: Wangtek, Simi Valley, Calif.

[21] Appl. No.: 433,618

[22] Filed: Nov. 9, 1989

[51] Int. Cl.[5] .................................................. G11B 5/56
[52] U.S. Cl. ........................................ 360/109; 360/76; 360/129
[58] Field of Search ......................... 360/103–109, 360/130.3–130.34, 78.02, 130.2–130.24, 129

[56] References Cited

U.S. PATENT DOCUMENTS

| | | | |
|---|---|---|---|
| 2,647,755 | 8/1953 | Townsley | 360/109 |
| 3,022,494 | 2/1962 | Hansen et al. | 360/109 |
| 4,093,966 | 6/1978 | Hall | 360/129 |
| 4,313,143 | 1/1982 | Zarr | 360/106 |
| 4,329,723 | 5/1982 | Schoenmakers | 360/109 |
| 4,485,420 | 11/1984 | Schoenmakers | 360/130.21 |
| 4,550,352 | 10/1985 | Nakao | 360/109 |
| 4,609,959 | 9/1986 | Rudi | 360/106 |
| 4,646,183 | 2/1987 | Cohen | 360/106 |
| 4,750,067 | 6/1988 | Gerfast | 360/106 |
| 4,835,646 | 5/1989 | Kurosawa et al. | 360/109 |

FOREIGN PATENT DOCUMENTS

| | | | |
|---|---|---|---|
| 53-17316 | 2/1978 | Japan | 360/76 |
| 58-97126 | 6/1983 | Japan | 360/76 |
| 63-71916 | 4/1988 | Japan | 360/109 |
| 1203581 | 1/1986 | U.S.S.R. | 360/109 |

OTHER PUBLICATIONS

IBM Tech Discl Bull, vol. 10, No. 2, May 1968, pp. 1906–1907, "Adjustable Magnetic Head" by Habich.

*Primary Examiner*—Aristotelis Psitos
*Assistant Examiner*—Alfonso Garcia
*Attorney, Agent, or Firm*—Nilsson Robbins Dalgarn Berliner Carson & Wurst

[57] ABSTRACT

An adjustable head mounting system for a magnetic recording device. The head mounting system includes a head tray for receiving a magnetic head and a bracket. The head tray is formed of a resilient material and has a first portion for receiving the head, a second portion intersecting the first portion along a first joining line, and a third portion intersecting the second portion along a second joining line. The three portions of the head tray each have a substantially planar surface and an adjustable coupling device to connect the surface to the bracket. The orientation and position of the head can be adjusted by adjusting the coupling device to pivot the head about the joining lines.

15 Claims, 2 Drawing Sheets

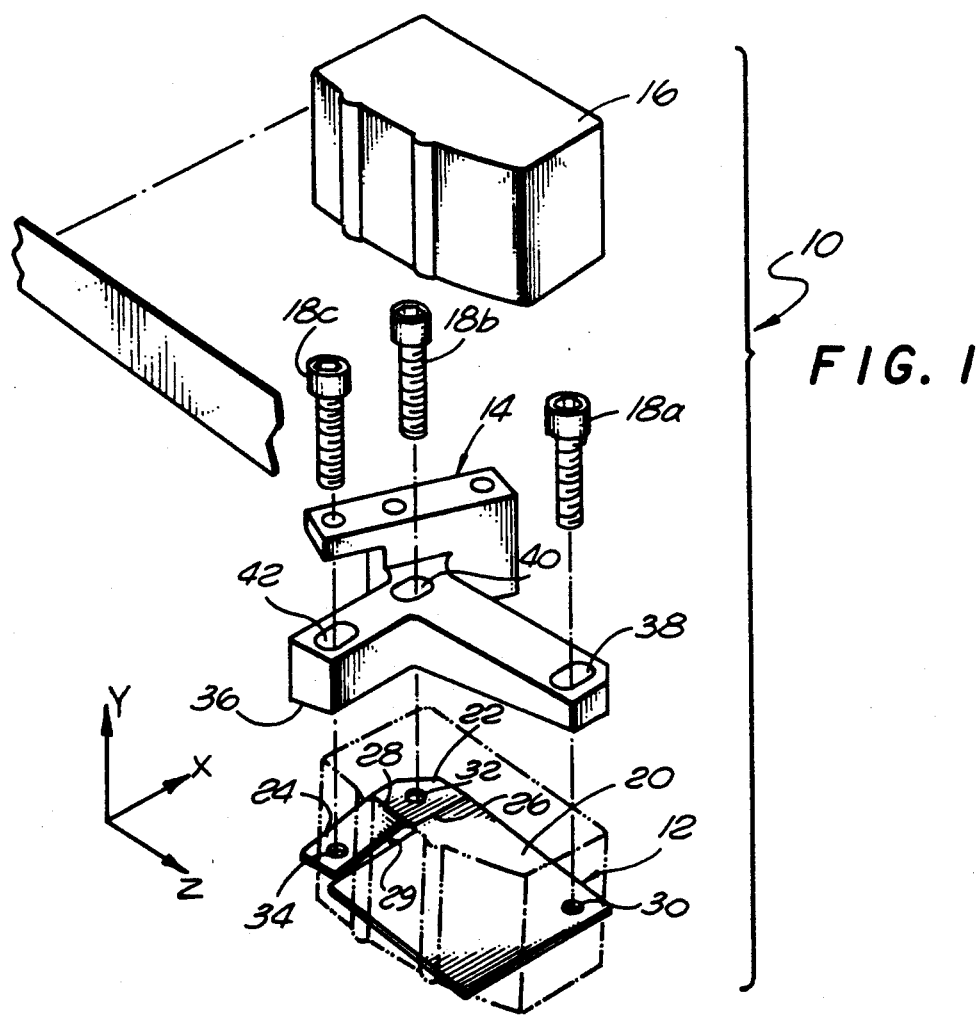
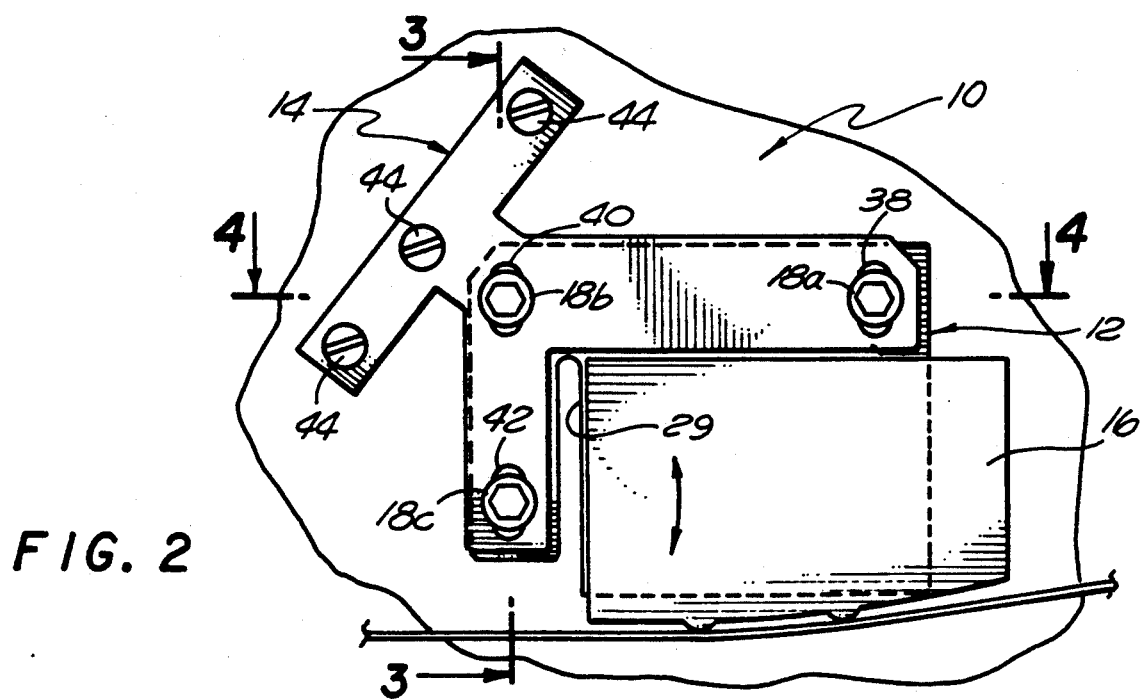

ADJUSTABLE MAGNETIC HEAD MOUNTING SYSTEM

BACKGROUND OF THE INVENTION

1. Field of the Invention

The present invention relates to magnetic heads, in particular, to a system for adjustably mounting a magnetic head in a recording or playback device.

2. Description of Related Art

Magnetic recording has gained widespread acceptance as a valuable method of data and information storage. To a large extent, this is because magnetic recording offers a method of storing vast amounts of information in a very compact form that can be readily and accurately retrieved. The popularity of magnetic recording is further enhanced because the storage media is relatively durable.

In typical magnetic recording systems the stored information is represented by magnetic fields of varying polarity and magnitude arranged in tracks along a magnetic medium such as a tape or disc. The tracks are formed by moving a magnetic medium with respect to a magnetic head. The magnetic head is provided with a coil which, when supplied with an electric current representative of the information to be stored, generates magnetic flux representative of the information to be stored. A corresponding magnetic flux is replicated in the magnetic media. During playback a recorded track is moved with respect to a magnetic head. The flux in the magnetic media generates a corresponding flux in the head which produces a current in the coil representative of the stored information.

Optimum operation of a recording device depends upon the proper orientation and position of the magnetic head. Otherwise, the use of an improperly oriented and positioned record head may result in the information being recorded in a manner that cannot be accurately retrieved on playback. Similarly, an improperly oriented or positioned playback head may result in the inaccurate retrieval of information even if the information was properly recorded. In either case, the integrity of the information storage system may be compromised and information may be lost.

Proper orientation and position of the magnetic head have become even more important because of attempts to increase the storage capacity of a magnetic media by increasing the number of tracks, or track density, on the media. Typically track density is increased through the sue of narrower track widths, closer track spacing, or both. As a result, in modern magnetic recording systems there is very little tolerance for error in the orientation and position of the magnetic head within the recorder.

Further, one of the advantages afforded by magnetic recording is that the media is designed for use on different devices. However, without a uniform orientation and position or the head, it may not be possible to use the media interchangeably on different devices. For example, if information is recorded on a machine having a head with a high azimuth angle, it may not be possible to accurately retrieve the information by using a machine having a very small azimuth angle for playback. As a result, to obtain optimum performance from magnetic recording or playback devices, it is essential to provide a head mounting mechanism that properly orients and positions the magnetic heads within such devices.

In the orientation and position of a magnetic head there are four different components which are important. The first three components are the azimuth, yaw (sometimes referred to as wrap), and zenith angles, which are rotation about the X, Y and Z axes, respectively. The fourth component is penetration, which is translation along the X axis.

In some magnetic recorders the head mounting mechanisms include complex arrangements of worm gears to adjust both the azimuth and zenith angles. However, because of the complexity of these systems, they are failure prone and are relatively expensive to manufacture and difficult to assemble and install. Further, such systems are unduly bulky and cannot be adapted for use on many compact magnetic recording devices.

In other head mounting systems, such as that described in U.S. Pat. No. 4,485,420, the head is fixed to a base plate which extends generally along the Z axis of the head. The base plate is then mounted within the recorder by attaching each and to a peg fixed to the frame of the recorder. By adjusting the height of the pegs, the azimuth angle of the head can be adjusted. However, these head mounting systems generally do not provide a means of adjusting the yaw or zenith angles, or the penetration of the head.

Another head mounting mechanism, of the type described in U.S. Pat. No. 4,550,352, incorporates an elastic body plate having a generally "T" shape. The base of the "T" is bent over itself and the head is affixed to the body member just above the bend. The cross bar of the body member is mounted between two pegs fixed to the recording device. As described above, the azimuth angle can be adjusted by varying the height of the pegs. One of the pegs is a spring loaded screw in order to facilitate this adjustment. Further, the body member is provided with another screw which adjusts the angle of the bend in the base of the "T," thereby adjusting the zenith angle of the head. However, this system typically does not allow adjustment of the yaw angle or head penetration. Further, because of the spring loaded screw, assembly and implementation of the system can be complex and expensive.

SUMMARY OF THE INVENTION

Accordingly, it is an object of the present invention to provide an adjustable mounting system for a magnetic head which allows for accurate and simple adjustment of the orientation and position of the magnetic head.

A further object of the invention is to provide an adjustable head mounting system having an uncomplicated structure which is compact, inexpensive to manufacture, easy to install, and reliable.

In accordance with these and other objects, an adjustable head mounting system in accordance with a preferred embodiment of the present invention comprises a head tray for receiving a magnetic head and a bracket mountable within the recording device. In the illustrated embodiment, the head tray is formed of a resilient material and has a first portion for receiving the head. A second portion intersects the first portion along a first joining line. A third portion intersects the second portion along a second joining line. The three portions of the head tray each have a substantially planar surface. Each of the substantially planar surfaces may be adjustably coupled to the bracket by an adjustable coupling device, a screw in the illustrated embodiment. The orientation and position of the head can be adjusted by adjusting the coupling devices to pivot the head about the joining lines.

In the illustrated embodiment, a slot separates the first planar surface from the third surface so that an adjustment to the orientation of the first surface ned not disturb the preadjusted orientation of the third surface. Hence, for example, adjustment of the azimuth of the head substantially does not affect the previously adjusted zenith.

Other objects and aspect of the invention will become apparent to those skilled in the art from the detailed description of the invention which is presented by way of example and not as a limitation of the present invention.

BRIEF DESCRIPTION OF THE DRAWINGS

FIG. 1 is an exploded view of an adjustable head mounting system in accordance with a preferred embodiment of the present invention.

FIG. 2 is a top view of the system of FIG. 1.

DESCRIPTION OF THE ILLUSTRATED EMBODIMENT

Figure 3:
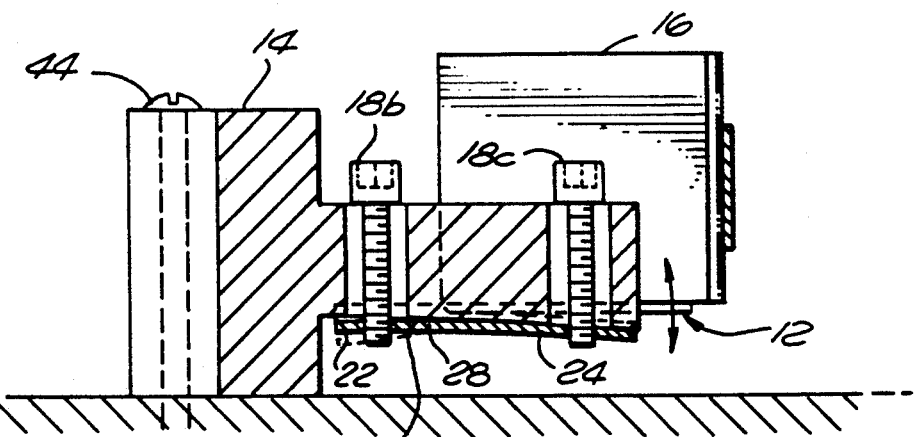
FIG. 3 is a cross sectional view taken along line 3—3 in FIG. 2.

An adjustable magnetic head mounting system in accordance with a preferred embodiment of the present invention is indicated in FIG. 1 at reference numeral 10. The head mounting system 10 includes a head tray 12 and a mounting bracket 14. A magnetic head 16 is received by the head tray 12 which is attached to the mounting bracket 14 by screws 18a, 18b, and 18c. As explained in more detail below, the orientation and position of the head 16 can be adjusted and maintained by pivoting the head tray 12 and tightening or loosening screws 18a, 18b, and 18c.

The head tray 12 is formed with a first portion 20, a second portion 22, and a third portion 24. Each portion has as planar surface which is not parallel with any of the other portions. The first portion 20 is joined to the second portion 2 along line 26, and the second portion 2 is joined to the third portion 24 along line 28. The fist portion 20 is not directly joined to the third portion 24. Instead, a slot 29 separates the portions 20 and 24. As will be explained in greater detail below, provision of the slot 29 allows adjustment of the orientation of head tray portion 20 (and hence the head 16) without substantially affecting prior adjustments to the head tray portions 22 and 24 (and their associated head orientations). The first, second, and third portions 20, 22, and 24 are each provided with threaded apertures 30, 32, and 34, respectively.

In the illustrated embodiment the head tray 12 is made of a single piece of resilient material having the slot 29. This simple structure greatly facilitates the efficient and inexpensive manufacture of the head tray. In the illustrated embodiment, the head tray is formed of a sheet of 302 type stainless steel; however any number of materials will work satisfactorily. Preferably the material is nonmagnetic. The thickness of the material as well as the other dimensions of the head tray will be dictated by the geometry of each particular application, but should be chosen in order to facilitate the adjustment process described below.

The first, second, and third portions of the head tray 12 of the illustrated embodiment are formed by deforming the resilient material along joining lines 26 and 28 which forms bends or ridges along the joining lines. As shown in FIG. 1, each bend line 26 and 28 starts at the top of the slot 29 and terminates at one edge of the tray 12. Although the magnitude of the angle of the bends at lines 26 and 28 may vary depending on the design requirements of any particular application, in the illustrated embodiment the bend angles are between approximately 1.5 to 2.0 degrees. In any case, it is preferably that the bend angles be of such a magnitude that the deformations which take place during the adjustment process described below do not exceed the elastic limit of the material used for the head tray 12.

The mounting bracket 14 has a surface 36 which is shaped to receive the first, second, and third portions 20, 22, and 24 of the head tray 12. To facilitate the adjustment process described below, the surface 36 may be sloped, as illustrated, and may include various planar portions angled in a manner similar to the head tray. The mounting bracket is provided with apertures 38, 40, and 42 corresponding to threaded apertures 30, 32, and 34. The apertures 38, 40, and 42 are elongated in the direction of the X axis. The head tray 12 is coupled to the mounting bracket 14 by screws 18a, 18b, and 18c, which extend through apertures 38, 40, and 42, and engage apertures 30, 32, and 34, respectively.

Figure 4:
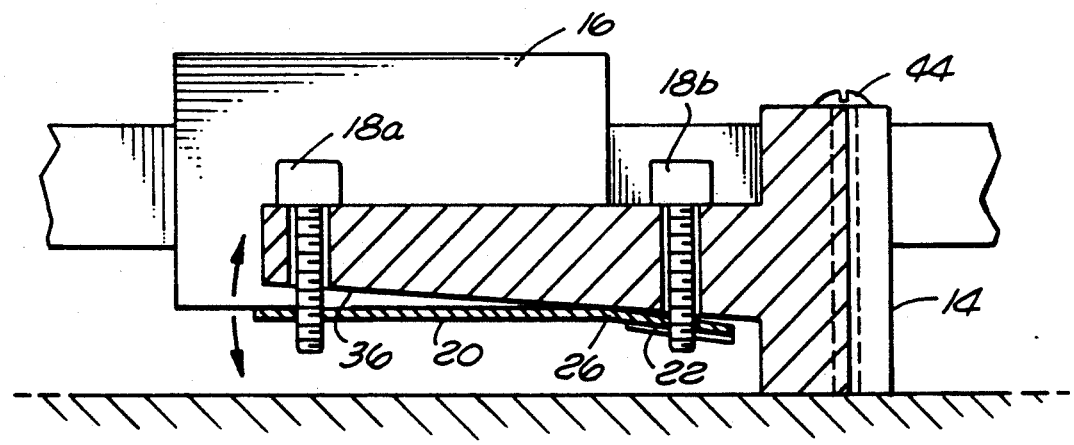
FIG. 4 is a cross sectional view taken along line 4—4 in FIG. 2.
Figure 5:
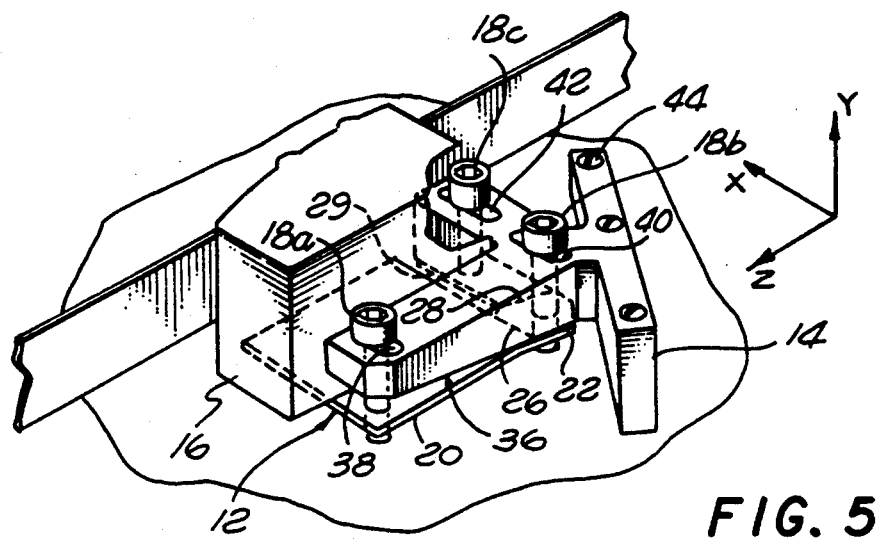
FIG. 5 is a rear perspective view of the device of FIG. 1.

As best seen in FIGS. 2–4, the entire system 10 is easily fixed within the recording device by means of screws 44 which pass through the mounting bracket 16 and engage the frame of the recording device. The uncomplicated structure and method of mounting the system within the recording device make installation of the system a relatively easy task; thus, contributing to the efficient manufacture of the recording device. Further, because the system is compact and has only a few parts, it is readily adapted for application in miniaturized recording devices and is highly reliable.

The head mounting system of the present invention allows for the relatively simple adjustment of the penetration, and the azimuth, yaw, and zenith angles of the head. To adjust the penetration and yaw angle of the head 16, the head tray 12 is loosely coupled to the bracket 14. As illustrated in FIG. 2, the elongation of the apertures 38, 40, and 42 allows the head tray 12, and hence the head 16, to be moved along the X axis to adjust penetration.

Similarly, holes 38, 40, and 42 allow some lateral movement of the screws 18a, 18b, and 18c. Thus, the head tray 12 can be rotated slightly about the Y axis to adjust the jaw angle. When both the penetration and the yaw angle have been properly adjusted, screw 18c can be tightened, thereby bringing the third portion 24 into frictional engagement with the surface 36 of the mounting bracket 14. The frictional engagement between portion 24 and surface 36 maintains the head tray 12 in the position corresponding the correct penetration and yaw position of the head 16.

Subsequent to the adjustment of the penetration and yaw angle, the zenith angle can be adjusted. As illustrated in FIG. 3, this is accomplished by rotating screw 18b. As the screw is tightened, the head 16 and the first and second portions 20 and 22 pivot with respect to the third portion 24 about the joining line 28. The resilient nature of the material used to form the head tray 12 allows the deformation necessary to pivot about line 28.

After adjusting the zenith angle, the azimuth angle can be properly set. As seen best in FIG. 4, the azimuth angle can be adjusted by turning screw 18a. As the screw is tightened, the head 16 and the first portion 20 pivot with respect to the second portion 22 about joining line 26.

The geometry of the illustrated embodiment is advantageous because it allows for the independent adjustment of the azimuth, yaw, and zenith angles. That is, the adjustment of one angle does not adversely affect the adjustment of a previously adjusted angle. As a result, the adjustment process is greatly simplified and can be carried out much more quickly and accurately than if the various adjustments were coupled. The uncoupling of the various adjustments is achieved, in the illustrated embodiment, by providing the slot 29 to separate the head tray portions 20 and 24 and configuring the head tray such that bend lines 26 and 28 at the top of the slot 29 are normal to each other with each line being generally parallel to one axis of the head. As a consequence, the azimuth and zenith adjustments can be substantially decoupled as described above.

However, it should be appreciated that while such a configuration simplifies the adjustment process, other configurations are also within the scope of the present invention. It should also be understood that this detailed description is set forth only for purposes of illustrating to limit the scope of the invention in any way. Clearly numerous additions, substitutions, and other modifications can be made to the invention without departing from the scope of the invention which is defined in the appended claims and equivalents thereof.

What is claimed is:

1. A mechanism for mounting a magnetic head and provides adjustment of the head penetration and the head azimuth, yaw, and zenith angles, said mechanism comprising:
   a magnetic head having an X, Y and Z axis, each one of said axes being orthogonal to both of the other axes, said head further including forward and rearward sides;
   a resilient tray, said tray having a first portion, upon which said magnetic head is mounted, a second portion and a third portion, said first portion having a generally planar surface extending substantially along the length of said rearward side of the magnetic head, said second portion being angled from said planar surface of said first portion and intersecting said planar surface along a first line generally parallel to said X axis of the magnetic head, said third portion being angled from said second portion and separated from said first portion, said third portion intersecting said second portion along a second line generally parallel to said Z axis of the magnetic head, said generally planar surface, second portion and third portion being integrally formed and bent along said first and second lines to define said portions, and said first, second, and third portions each being provided with a threaded aperture;
   a bracket having a mounting surface, said mounting surface provided with three apertures aligned with the threaded apertures in said tray, said apertures being elongated in the direction of said X axis; and
   three screws, each screw passing through one of said elongated apertures and engaging the corresponding threaded aperture to adjustably coupled said tray to said bracket,
   whereby the penetration of the head can be adjusted by moving the screws along the X axis within the elongated apertures, the yaw angle can be adjusted by twisting the head tray about the Y axis and moving the screws within the elongated apertures, the zenith angle can be adjusted by manipulating the screw which engages the threaded aperture in the second portion to rotate the head about the intersection between the second portion and the third portion, and the azimuth angle can be adjusted by manipulating the screw which engages the first portion to rotate the head about the intersection between the first portion and the second portion.

2. A mechanism for adjustably mounting a magnetic head, said mechanism comprising:
   a tray for receiving a magnetic head, said tray having a mounting surface defined by first, second, and third planar portions oriented such that each of the three planar portions lie in different planes, the second planar portion being connected to the first planar portion along a first joining line, the third planar portion being connected to the second planar portion along a second joining line which is not parallel to the first joining line, and the third planar portion being separated from the first planar portion;
   a bracket; and
   means for coupling the tray to the bracket such that at least one of said planar portions abuts the bracket, said coupling means including means for pivoting the planar portions about the joining lines to selectively adjust the displacement of the planar portions with respect to the bracket to thereby adjust the orientation of the tray.

3. The mechanism of claim 2 wherein the joining lines are substantially orthogonal.

4. The mechanism of claim 2 wherein the head tray is made from a single piece of material bent along the first and second joining lines to form the first, second, and third planar portions.

5. The mechanism of claim 2 wherein each of the first, second, and third planar portions is provided with a threaded aperture and the bracket is provided with corresponding apertures, said coupling means comprises three screws, each screw passing through one of the three apertures in the bracket and engaging the corresponding threaded aperture in one of said planar portions, one of said screws maintains one of the planar portions against the bracket and either of the other two screws tends to move one of the planar portions toward the bracket when rotated in one direction.

6. The mechanism according to claim 5 wherein the holes in the bracket are elongated to allow the screws to move laterally therein.

7. The mechanism of claim 2 wherein each of the first, second, and third planar portions is provided with an aperture and the bracket is provided with corresponding threaded apertures, said coupling means comprises three screws, each screw passing through one of the apertures in the planar portions and engaging the corresponding threaded aperture in the bracket, one of said screws maintains one of said planar portions against the bracket while either of the remaining screws tends to move one of the planar portions toward the bracket when rotated in a first direction and away from the bracket when rotated in a second direction.

8. The mechanism of claim 7 wherein the holes in the planar portions are elongated to allow the screws to move laterally therein.

9. The mechanism of claim 2 wherein the tray is resilient to permit the planar portions to rotate with respect to each other, said rotation being generally about one of the joining lines.

10. A mechanism for adjustably mounting a magnetic head comprising:
   a head tray for receiving a magnetic head, said head tray having a mounting surface defining by first, second, and third planar portions wherein each of the three planar portions lies in different planes, said mounting surface configured such that the second planar portion is connected to the first planar portion along a first joining line, and the third planar portion along a second joining line which is not parallel to the first joining line, each of said planar portions being provided with a threaded aperture, said head tray formed of a single piece of material which defines a slot separating the third planar surface from the first planar surface, said material being bent along the joining lines to define said planar portions, said material being resilient to allow the planar portions to pivot with respect to each other about the joining lines;
   a bracket having a mounting surface, said mounting surface provided with apertures corresponding to the threaded apertures and being elongated along a lateral axis; and
   a plurality of screws for adjustably coupling the head tray to the bracket, each screw passing through an aperture in the mounting bracket and engaging a threaded aperture on one of the planar portions, one of said screws maintaining one of said planar portions against the bracket mounting surface, wherein rotation of the other screws causes the planar portions to pivot about the joining lines to adjust the orientation of the head tray, and wherein the screws can move laterally within the elongated apertures in the mounting bracket to allow movement of the mounting bracket along the axis of elongation.

11. A system for adjustably mounting a magnetic head having an X, Y and Z axis, each one of said axes being orthogonal to both of the other axes, said system comprising:
   a bracket;
   a resilient tray having an upper surface including first, second and third substantially planar portions that are oriented in different planes, said first portion adapted to support said magnetic head, said second portion intersecting said first portion along a first line that forms a juncture therebetween, and said third portion intersection said second portion along a second line that forms a juncture between said second and third portions; and
   means for independently coupling each planar portion to said bracket, said coupling means including means for adjusting the position of said first portion relative to said bracket such that the position of a magnetic head placed on said first portion can be adjusted relative to said bracket.

12. The device of claim 11 wherein said first line is substantially orthogonal to said second line.

13. The device of claim 11 wherein said coupling means comprises apertures provided in said bracket, threaded apertures provided in said tray and screws which pass through said apertures in the bracket and engage said apertures in the tray.

14. The device of claim 13 wherein said apertures in the bracket are elongated in the direction of said first intersecting line.

15. A system for adjustably mounting a magnetic head comprising:
   a bracket;
   a head tray formed of resilient material and having a first portion for receiving the head, said first portion having a substantially planar surface, said head tray having a second substantially planar portion intersecting the first portion along a first joining line, and a third substantially planar portion intersecting said second portion along a second joining line, the tray material defines a slot separating the third planar portion from the first planar portion; and
   coupling means associated with each planar portion for adjustably coupling each portion to said bracket so as to adjust the position of the first portion relative to the bracket.

* * * * *

UNITED STATES PATENT AND TRADEMARK OFFICE
CERTIFICATE OF CORRECTION

PATENT NO. : 5,146,377
DATED : September 8, 1992
INVENTOR(S) : Hamid Baheri

It is certified that error appears in the above-identified patent and that said Letters Patent is hereby corrected as shown below:

| | |
|---|---|
| Column 1, line 51 | delete "sue" and insert --use-- |
| Column 1, line 58 | delete "or" and insert --for-- |
| Column 2, line 21 | delete "and" and insert --end-- |
| Column 3, line 6 | delete "ned" and insert --need-- |
| Column 3, line 45 | delete "as" and insert --a-- |
| Column 3, line 47 | delete "2" and insert --22-- |
| Column 3, line 48 | delete "2" and insert --22-- |
| Column 3, line 48 | delete "fist" and insert --first-- |
| Column 4, line 13 | delete "preferably" and insert --preferable-- |
| Column 4, line 55 | delete "jaw" and insert --yaw-- |
| Column 5, line 29 | after "illustrating" insert --an example of the present invention. It should not be considered-- |
| Column 6, line 41 | delete "head" |
| Column 6, line 55 | after "director" add --and away from the bracket when rotated in another direction-- |
| Column 7, line 13 | delete "defining" and insert --defined-- |
| Column 8, line 10 | delete "intersection" and insert --intersecting-- |

Signed and Sealed this

Fourteenth Day of September, 1993

Attest:

BRUCE LEHMAN

Attesting Officer          Commissioner of Patents and Trademarks